US012679321B2

(12) United States Patent　　　　(10) Patent No.:　US 12,679,321 B2

Michels et al.　　　　　　　　　　　(45) Date of Patent:　Jul. 14, 2026

---

(54) METHOD FOR DETERMINING WEAR VALUES ON AT LEAST A FIRST AND A SECOND VEHICLE BRAKE OF A MOTOR VEHICLE

(71) Applicant: ZF Active Safety GmbH, Koblenz (DE)

(72) Inventors: Erwin Michels, Kail (DE); Benedikt Ohlig, Vallendar (DE); Matthias Fuchs, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 545 days.

(21) Appl. No.: 18/174,244

(22) Filed: Feb. 24, 2023

(65) Prior Publication Data

US 2023/0271597 A1　　Aug. 31, 2023

(30) Foreign Application Priority Data

Feb. 25, 2022　(DE) .......................... 102022104608.7

(51) Int. Cl.
| | |
|---|---|
| *F16D 66/02* | (2006.01) |
| *B60T 17/22* | (2006.01) |
| *F16D 65/18* | (2006.01) |

(52) U.S. Cl.
CPC .......... *B60T 17/221* (2013.01); *F16D 65/183* (2013.01); *F16D 66/02* (2013.01)

(58) Field of Classification Search
CPC ........................ F16D 66/021; F16D 2066/006
See application file for complete search history.

(56) References Cited

U.S. PATENT DOCUMENTS

| | | | | |
|---|---|---|---|---|
| 2016/0138665 | A1* | 5/2016 | Antanaitis | ............... B60T 17/22 701/70 |
| 2019/0381987 | A1* | 12/2019 | Michels | ............... F16D 66/022 |
| 2022/0018413 | A1* | 1/2022 | Matsui | .................... F16D 66/00 |
| 2022/0373050 | A1* | 11/2022 | Jin | ........................... F16D 65/18 |
| 2024/0175473 | A1* | 5/2024 | Son | ........................... B60Q 9/00 |

* cited by examiner

*Primary Examiner* — Nicholas J Lane
(74) *Attorney, Agent, or Firm* — Brooks Kushman, P.C.

(57) ABSTRACT

A method is disclosed for determining wear values on at least a first and a second vehicle brake of a motor vehicle. The first and second vehicle brakes are assigned to a first or second vehicle wheel of a same first wheel axle. The first vehicle brake has an actuator piston which presses a friction lining against a brake disc mounted such that it rotates in an actuating position, and an electromechanical actuator unit.

17 Claims, 3 Drawing Sheets

METHOD FOR DETERMINING WEAR VALUES ON AT LEAST A FIRST AND A SECOND VEHICLE BRAKE OF A MOTOR VEHICLE

CROSS-REFERENCE TO RELATED APPLICATION

This application claims priority to German Priority Application No. 102022104608.7, filed Feb. 25, 2022, the disclosure of which is incorporated herein by reference in its entirety.

TECHNICAL FIELD

The disclosure relates to a method for determining wear values on at least a first and a second vehicle brake of a motor vehicle.

BACKGROUND

Vehicle braking systems which comprise multiple vehicle brakes are frequently used in motor vehicles, wherein each vehicle brake is assigned to a vehicle wheel of the motor vehicle.

Each vehicle brake may, in turn, have a hydraulically actuable foot brake and/or a mechanically or electromechanically actuable park brake (EPB) and/or an electromechanically actuable brake (EMB).

A hydraulic foot brake comprises an actuator piston that is displaceable under the effect of hydraulic pressure, said actuator piston pressing friction linings against a brake disc coupled with a vehicle wheel of the motor vehicle when an actuating position is adopted and thereby braking the motor vehicle. The hydraulic pressure required for this is normally built up by the vehicle driver pressing a pedal and reinforced by the vehicle braking system.

In the event that the vehicle brake should have an electromechanical park brake (EPB) and/or an electromechanical foot brake (EMB), this is frequently designed as an electro-mechanical actuator unit.

The vehicle brakes of the vehicle brake system in this case need not all have the same design. Hence, it is customary, for example, for only the vehicle wheels on a vehicle axle, in particular the rear axle, to be provided with an electric park brake (EPB).

The running of motor vehicles results in braking actions, meaning that the friction linings of the vehicle brakes of the motor vehicle wear out. In other words, the friction linings are abraded by the braking actions and wear over time.

If there is excessive wear to the friction linings, the desired braking action can no longer be achieved, which is why the worn brake linings have to be replaced.

At the same time, in the interests of economy, the friction lining should not be replaced too early, which is why efforts are made to determine a wear value, in other words an indication of the state of wear of a vehicle brake, during normal vehicle running aside from the routine servicing of a vehicle.

Methods for determining wear values on vehicle brakes are known from the prior art, but they are often too expensive.

SUMMARY

What is needed is an arrangement capable of being able to determine wear values of vehicle brakes of a motor vehicle continuously, accurately and efficiently.

The disclosure is directed to a method for determining wear values on at least a first and a second vehicle brake of a motor vehicle, which brakes are assigned to a first or second vehicle wheel of a same first wheel axle. The first vehicle brake has an actuator piston which presses a friction lining against a brake disc mounted such that it rotates in an actuating position, and an electromechanical actuator unit. In this case, the method comprises the following steps:

determining a first wear value which indicates wear to the friction lining of the first vehicle brake, by taking into account at least one wear-determining influencing parameter affecting a running history of the vehicle;

depending on whether the first wear value satisfies a predetermined criterion, taking of a measurement of the wear to the friction lining of the first vehicle brake by moving the electromechanical actuator unit and by recording a profile of an operating parameter of the electromechanical actuator unit during movement;

determining, on the basis of the measurement, a second wear value which indicates wear to the friction lining of the first vehicle brake; and determining a third wear value of the second vehicle brake based on the second wear value of the first vehicle brake.

The disclosure therefore envisages that the first wear value of the friction lining of the first vehicle brake is determined first, wherein this takes place during each actuation of the first vehicle brake, for example. Insofar as the first wear value satisfies a predetermined criterion and the electromechanical actuator unit is actuated, for example, a measurement can be taken of the wear to the friction lining of the first vehicle brake by the electromechanical actuator unit. Based on this measurement, a second wear value can then be determined, which describes the state of wear of the friction lining of the first vehicle brake more accurately based on the measurement.

The basic idea underlying the disclosure then envisages that inferences are drawn as to the state of wear, in other words the third wear value, of the second vehicle brake on the same first wheel axle, wherein no measurement has to be carried out on the second vehicle brake but a precise estimate of the state of wear of said second vehicle brake can nevertheless be made.

All wear values within the framework of this disclosure may be a remaining uncritical residual thickness of the brake lining, for example, of the vehicle brake associated with the wear value in each case. The remaining uncritical residual thickness in this case indicates the residual thickness of the brake lining, which can still be removed during uncritical operation of the vehicle brake.

The predetermined criterion of the first wear value advantageously involves an assessment as to whether the first wear value lies above a predetermined threshold value. The predetermined threshold value allows unnecessary measurements for determining the second wear value to be omitted, so that the measurement is only taken after a critical first wear value has arisen.

According to one exemplary arrangement of the disclosure, determining the first wear value includes a calculation based on a mathematical model, wherein the wear-determining influencing parameter affecting the running history of the vehicle is taken into account in the mathematical model. In one exemplary configuration, the mathematical model in this case is adjusted using the second wear value, For example, at least one influencing parameter is specified for the mathematical model as the input variable, wherein the mathematical model then determines and issues the first wear value. The first wear value therefore provides first information on the estimated state of wear of the friction lining of the first vehicle brake. Moreover, the mathematical model has the advantage that multiple wear-determining influencing parameters can easily be taken into account.

One aspect of the disclosure envisages that the wear-determining influencing parameter affecting the running history of the vehicle comprises at least one of the following influencing parameters:

final total of the distance driven by the vehicle;

total distance driven by the vehicle since the friction lining was last replaced;

time that has elapsed since the vehicle brake system was first put into service;

time that has elapsed since the friction lining was last replaced;

period of use of the vehicle since it was first put into service; and period of use of the vehicle since the friction lining was last replaced.

It has been shown that the influencing parameters listed, which all relate to the running history of the vehicle, particularly affect the state of wear of the brake lining of a vehicle brake, which is why the first wear value can be determined with relative accuracy using these influencing parameters.

Determining the third wear value advantageously involves a calculation based on an additional mathematical model, wherein at least one wear-determining influencing parameter affecting the running history of the second vehicle brake is taken into account in the additional mathematical model. In particular, the additional mathematical model in this case is adjusted using the second wear value. For example, the wear-determining influencing parameter affecting the running history of the second vehicle brake is specified for the additional mathematical model as an input variable, wherein the additional mathematical model then determines and issues the third wear value. The third wear value therefore provides information on the estimated state of wear of the friction lining of the second vehicle brake. Moreover, the additional mathematical model has the advantage that multiple wear-determining influencing parameters, which particularly provide information on the state of wear of the second vehicle brake, can be taken into account.

In one exemplary arrangement, the wear-determining influencing parameter affecting the running history of the second vehicle brake comprises at least one of the following influencing parameters:

duration of previous braking actions of the second vehicle brake;

pressure profile, for example the time curve of the friction braking force, at the second vehicle brake of previous braking actions by the second vehicle brake;

pressure gradient profile, for example, the time curve of the friction braking force gradients, at the second vehicle brake of previous braking actions by the second vehicle brake;

wheel speeds of the second vehicle wheel during previous braking actions by the second vehicle brake;

temperature profile of the previous braking actions of the second vehicle brake on a component of the second vehicle brake; and environmental condition to which the second vehicle brake was exposed during previous braking actions.

It has been shown that the influencing parameters listed, which all relate to the running history of the second vehicle brake, have a particular effect on the specific state of wear of the brake lining of the second vehicle brake, which is why the third wear value can be determined particularly precisely using these influencing parameters. The second wear value, which was determined on the basis of a measurement, can be used along with the influencing parameters affecting the running history of the second vehicle brake, to determine a particularly precise third wear value of the second vehicle brake. The third wear value is therefore based firstly on a measurement and at the same time also on at least one specific influencing parameter of the second vehicle brake.

In one exemplary variant, when determining the third wear value, an axle load distribution of the previous braking actions is taken into account, wherein a characteristic curve between the second and third wear value of the first wheel axle has a substantially linear profile. Since within the same wheel axle, a roughly identical weight displacement onto the vehicle wheels of the motor vehicle assigned to the wheel axle is assumed during a braking action, a substantially linear characteristic curve of the wear values arises due to the similar braking load.

One aspect of the disclosure envisages that the first wheel axle, to which the first and second vehicle brakes are assigned, is the front wheel axle or the rear wheel axle of the motor vehicle. Both the front wheel axle and the rear wheel axle of the motor vehicle are suitable in principle for the assignment of the first vehicle brake, which is capable of performing a measurement, on the basis of which the second wear value is determined.

Advantageously, a third and fourth vehicle wheel are assigned to a second wheel axle of the motor vehicle which differs from the first wheel axle, to which in turn a third vehicle brake and a fourth vehicle brake are assigned, Moreover, a fourth wear value of the third vehicle brake and a fifth wear value of the fourth vehicle brake are determined on the basis of the second wear value of the first vehicle brake. In this way, very precise wear values of the third and fourth vehicle brake can be determined, which again are indirectly dependent on the exact measurement as a consequence of the determination of the second wear value.

In accordance with one exemplary arrangement of the disclosure, when determining the fourth and fifth wear value, the axle load distribution of the previous braking actions is taken into account, wherein characteristic curves run substantially either exponentially or logarithmically between the second and fourth wear value and also between the second and fifth wear value, Due to the weight displacement at the motor vehicle resulting from a braking action, the load on the front wheel axle increases disproportionately by comparison with the rear wheel axle, which is why the wear also increases disproportionately as a result of an increased braking force at the vehicle brakes on the front wheel axle by comparison with the vehicle brakes on the rear wheel axle. This knowledge can be taken into account when determining the fourth and fifth wear values which describe the state of wear of the vehicle brakes of the second wheel axle.

A further aspect of the disclosure envisages that the electromechanical actuator unit comprises an electromotive drive unit and an actuator unit interacting with the actuator piston. The electromotive drive unit is designed to move the actuator unit, in order to press the friction lining against a brake disc. The operating parameter of the electromechanical actuator unit in this case comprises a motor current of the electromotive drive unit and/or a speed of the electromotive drive unit. Through the operating parameters of the electromechanical actuator unit, the stroke of the actuator piston, for example from a reference position to an actuating position of the vehicle brake, can be determined, as a result of which, for example, an indirect measurement of the second wear parameter, so the uncritical residual thickness of the brake lining of the second vehicle brake, for example, can take place.

BRIEF DESCRIPTION OF DRAWINGS

The disclosure is explained below with the help of various exemplary arrangements which are shown in the attached drawings. In the drawings.

DETAILED DESCRIPTION

Figure 1:
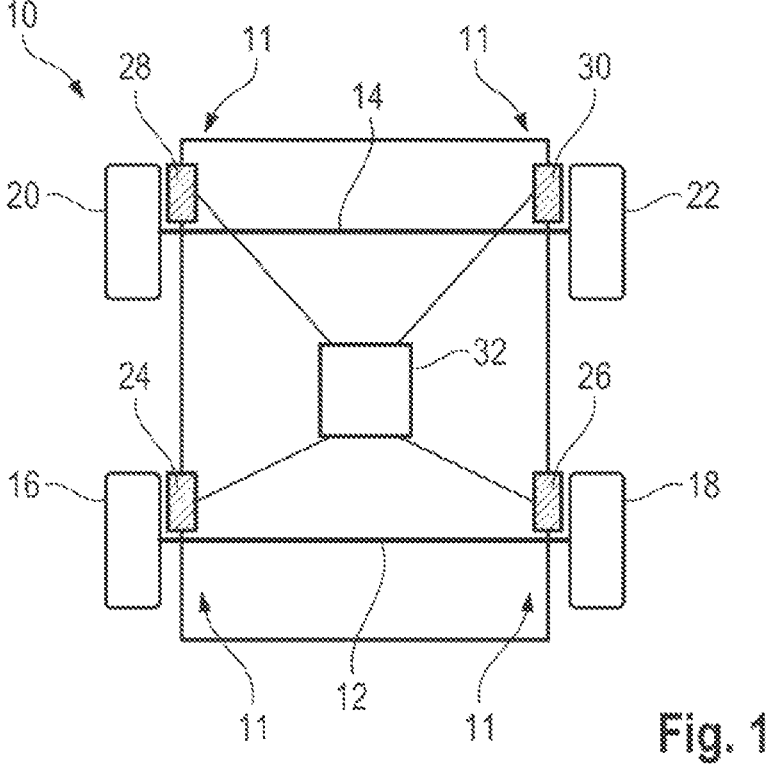
FIG. 1 shows a schematic plan view of a motor vehicle which is designed for implementing a method according to the disclosure for determining wear values on at least a first and second vehicle brake of the motor vehicle.

A motor vehicle 10 in which a vehicle brake system 11 is arranged is schematically depicted in FIG. 1.

The motor vehicle 10 comprises a first wheel axle 12, in this case the rear wheel axle, for example, and a second wheel axle 14, in this case the front wheel axle, for example.

A first and a second vehicle wheel 16, 18 are arranged on the first wheel axle 12 and a third and fourth vehicle wheel 20, 22 are arranged on the second wheel axle 14.

Consequently, the first and second vehicle wheel 16, 18 form the rear wheels of the motor vehicle 10 and the third and fourth vehicle wheel 20, 22 form the front wheels of the vehicle 10.

In addition, a brake disc, which is mechanically coupled to the respective vehicle wheel 16-22 in such a manner that it is mounted rotatably thereon, is provided on each of the vehicle wheels 16-22. When one of the brake discs is braked by the vehicle braking system 11, the associated vehicle wheel 16-22 is braked in a known manner.

The vehicle braking system 11 shown in FIG. 1 comprises a first, second, third and fourth vehicle brake 24-30, wherein the first vehicle brake 24 is assigned to the first vehicle wheel 16, the second vehicle brake 26 to the second vehicle wheel 18, the third vehicle brake 28 to the third vehicle wheel 20 and the fourth vehicle brake 30 to the fourth vehicle wheel 22.

The vehicle brakes 24-30 each comprise a hydraulically operated foot brake, which is set up to brake the respective brake disc, and therefore the respective vehicle wheel 16-22, when a brake pedal is actuated during the running of the motor vehicle 10. In addition, the first vehicle brake 24 comprises an electromotive actuator unit; for performing a park brake function in this case. Details of the first vehicle brake 24 are described below in connection with FIG. 2.

The vehicle braking system 11 shown in FIG. 1 further comprises a control unit 32. The control unit 32 in turn has a processor and a memory which is set up to implement a method for determining wear values V1-V5 on at least the first and the second vehicle brake 24, 26. For this purpose, corresponding instructions are stored in the memory of the control unit 32, which instructions prompt the processor of the control unit 32 to implement the method.

The control unit 32 may be a central control unit of the motor vehicle 10, for example, which is also used to control further functions of the motor vehicle 10. In addition, the control unit 32 may also be a separate control unit of the vehicle braking system 11.

Figure 2:
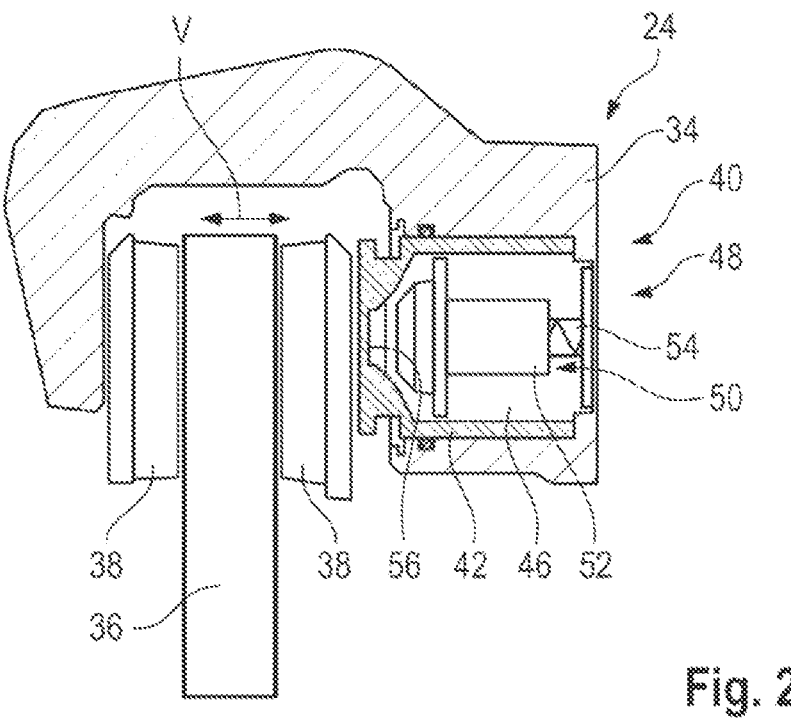
FIG. 2 shows a schematic view of the first vehicle brake of the vehicle from FIG. 1.

The first vehicle brake 24 shown in slightly more detail in FIG. 2 is briefly described below. The first vehicle brake 24 is designed as a floating caliper brake, wherein only selected components of the first vehicle brake 24 are depicted.

The first vehicle brake 24 has a brake caliper 34. In addition, a brake disc 36 is provided which is coupled with the first vehicle wheel 16 in a non-rotatable manner. Friction linings 38, which can be brought into abutment with the brake disc 36, in order to achieve a braking force, lie opposite the brake disc 36 on both sides.

For this purpose, a foot brake 40 of the first vehicle brake 24 comprises a displaceable actuator piston 42 received in the brake caliper 34. The operating piston can be moved along a displacement axis V, while hydraulic fluid is fed into, and drained from, a hydraulic chamber 46.

Overall, the friction linings 38 can therefore be brought into abutment with the brake disc 36, in order to achieve a braking force, and when the hydraulic pressure is reduced again, it can be released from said brake disc, in order to guarantee the foot brake function.

In addition, it can be seen in FIG. 2 that for the park brake function, an electromechanical actuator unit 48 is received in the hydraulic chamber 46, which actuator unit can likewise move along the displacement axis V. The electromechanical actuator unit 48 comprises an actuator unit 50 which is designed as a nut/spindle arrangement. To be more precise, the actuator unit 50 comprises a spindle nut 52 which is movable by rotating a spindle 54 translationally along the displacement axis V. In this case, the spindle nut 52 can be brought into abutment with a piston base 56 of the actuator piston 42.

The spindle 54 of the actuator unit 50 is driven rotationally by an electromotive drive or gear unit which is not shown separately, in order to achieve the desired displacement movement of the spindle nut 52 along the displacement axis V.

During customary driver-controlled service braking, hydraulic pressure builds up in the hydraulic chamber 46 and the actuator piston 42 is moved along the displacement axis V into an actuating position which generates braking force. In this case, it comes into abutment with the friction lining 38 facing the actuator piston 42, brings said friction lining into abutment with the brake disc 36 and tensions the first vehicle brake 24. In order to reduce the braking force, the actuator piston 42 moves back into its original position as a result of a reduction in hydraulic pressure.

The electromechanical actuator unit 48 may generally be activated in the presence or absence of hydraulic pressure, in order to move the actuator piston 42 in the actuating position thereof and/or to fix it mechanically therein. For this purpose, the spindle nut 52 is moved along the displacement axis V in the manner described above, during which it rests against the piston base 56.

The design of the second, third and fourth vehicle brakes 26, 28, 30 largely corresponds to the design just described of the first vehicle brake 24, wherein these have no electromechanical actuator unit 48. Accordingly, only the hydraulic fluid is found in the hydraulic chamber 46.

Figure 3:
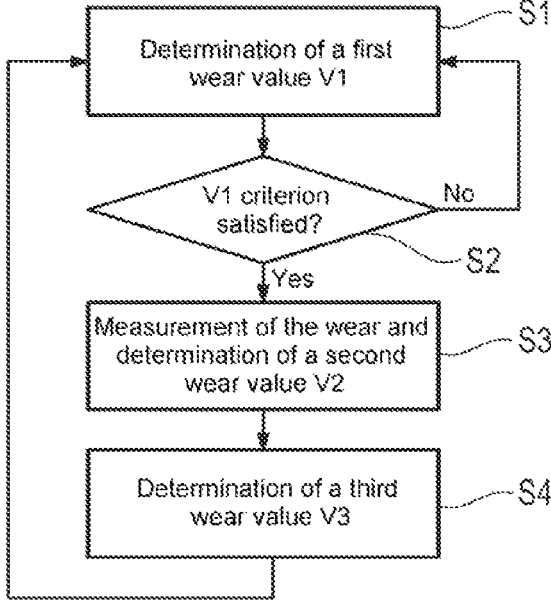
FIG. 3 shows a flow chart of the method according to the disclosure for determining wear values at the first and second vehicle brake of the motor vehicle from FIG. 1.

A flow chart is shown in FIG. 3, with which the method according to the disclosure for determining wear values V1, V2, V3 on the first and second vehicle brake 24, 26 of the motor vehicle 10 is explained below.

In a first step S1, a first wear value V1 which indicates wear to the friction linings 38 of the first vehicle brake 24 is determined taking account of at least one wear-determining influencing parameter affecting a running history of the vehicle 10.

In this case, the first wear value V1 is determined based on a mathematical model, wherein the wear-determining influencing parameter affecting the running history of the motor vehicle is taken into account in the mathematical model.

For example, at least one influencing parameter is specified for the mathematical model as the input variable, wherein the mathematical model then determines and issues the first wear value V1.

The wear-determining influencing parameters affecting the running history of the motor vehicle 10 include, for example, the final total of the distance driven by the motor vehicle 10, the total distance driven by the motor vehicle 10 since the friction linings 38 of the first vehicle brake 24 were last replaced, the time that has elapsed since the vehicle brake system 11 was first put into service, the time that has elapsed since the friction linings 38 of the first vehicle brake 24 were last replaced, the period of use of the motor vehicle 10 since it was first put into service and the period of use of the motor vehicle 10 since the friction linings 38 of the first vehicle brake 24 were last replaced.

In one step S2, a check is then made as to whether the first wear value V1 satisfies a predetermined criterion.

The predetermined criterion of the first wear value V1 makes it possible to assess, for example, whether the first wear value V1 lies above a predetermined threshold value. The predetermined threshold value may be a critical wear value, for example, from which more accurate knowledge of the wear on the first vehicle brake 24 is required.

If the criterion is met, there is a jump to step S3. Otherwise, there is a jump back to step S1, where the first wear value V1 is determined once again.

In step 33, a measurement of the wear to the friction linings 38 of the first vehicle brake 24 is then carried out by moving the electromechanical actuator unit 48 and by recording a profile of an operating parameter of the electromechanical actuator unit 48 during movement.

In this way, the stroke of the actuator piston 42, and therefore the remaining uncritical residual thickness of the friction linings 38 of the first vehicle brake 24 are determined directly or indirectly.

For example, the uncritical residual thickness 38 of the first vehicle brake 24 is a second wear value V2. The second wear value V2 is therefore determined on the basis of the measurement previously carried out.

The operating parameter of the electromechanical actuator unit 48 may be a motor current of the electromotive drive unit and/or a speed of the electromotive drive unit, for example.

In the following step S4, a third wear value V3 of the second vehicle brake 26 is determined based on the second wear value V2 of the first vehicle brake 24.

For example, in order to determine the third wear value V3, a calculation can take place based on an additional mathematical model, wherein at least one wear-determining influencing parameter affecting the running history of the second vehicle brake 26 is taken into account in the additional mathematical model.

For example, the at least one wear-determining influencing parameter affecting the running history of the second vehicle brake 26 is specified for the additional mathematical model as the input variable, wherein the additional mathematical model then determines and issues the third wear value V3.

The wear-determining influencing parameters affecting the running history of the second vehicle brake include, for example, the duration of previous braking actions of the second vehicle brake 26, the pressure profile, for example the time curve of the friction braking force, at the second vehicle brake 26 of previous braking actions by the second vehicle brake 26, the pressure gradient profile, in one exemplary arrangement the time curve of the friction braking force gradient, at the second vehicle brake 26 of previous braking actions by the second vehicle brake 26, the wheel speeds of the second vehicle wheel 18 during previous braking actions by the second vehicle brake 26, the temperature profile of the previous braking actions by the second vehicle brake 26 at a component of the second vehicle brake 26, and an environmental condition to which the second vehicle brake 26 was exposed during previous braking actions.

Theoretically, the additional mathematical model could determine a third, but relatively inaccurate, wear value V3 even without the second wear value V2. The inclusion of the second wear value V2 in the additional mathematical model can therefore also be regarded as an adjustment to the additional mathematical model.

Figure 5:
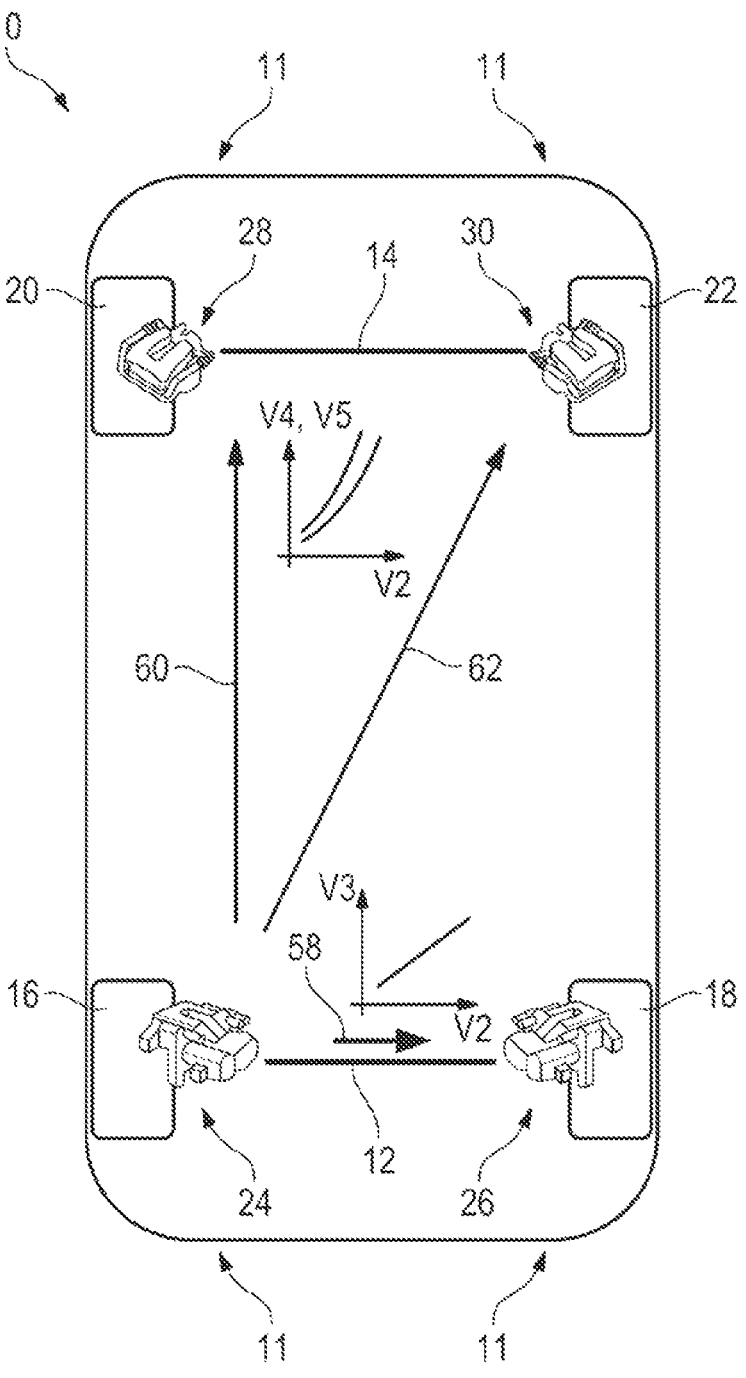
FIG. 5 shows a further schematic plan view of the motor vehicle from FIG. 1, wherein qualitative characteristic curves of the second, third, fourth and fifth wear values are depicted in addition.

When determining the third wear value V3 from the second wear value V2 (indicated by an arrow 58 in FIG. 5), a substantially linear characteristic curve can be expected between the second and third wear value V2, V3, as these wear values V2, V3 originate from the first and second vehicle brake 24, 26 of the same first wheel axle 12 and a similar axle load distribution can be expected within a wheel axle.

In other words, knowing the axle load distribution during the previous braking actions can therefore be used for a more accurate determination of the third wear value V3. In one exemplary arrangement, the control unit 32 processes the axle load distribution of the previous braking actions for this purpose when determining the third wear value V3.

After step S4 there is an option of jumping back to step S1, so that the method steps S1-S4 are very frequently run through during the entire live cycle of the vehicle 10.

To summarize, the overriding aim of the method described is that of determining the most accurate third wear value V3 possible of the second vehicle brake 26. Since a measurement for determining the second wear value V2 on the first vehicle brake 24 is necessary for this purpose, the steps S3 and S4 can be carried out during each actuation of the electromechanical actuator unit 48 of the first vehicle brake 24, for example.

Figure 4:
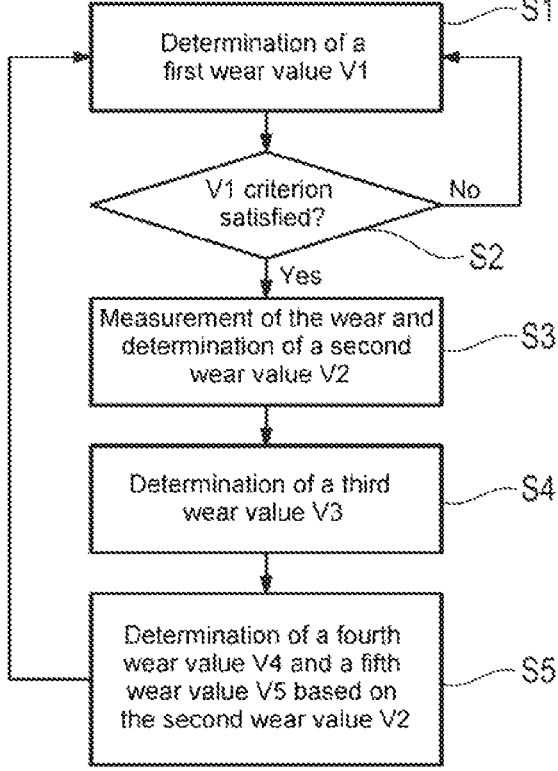
FIG. 4 shows a flow chart of the method according to the disclosure for determining wear values at the first, second, third and fourth vehicle brake of the motor vehicle from FIG. 1.

A further flow chart is depicted in FIG. 4, which describes an extended exemplary arrangement of the method shown in FIG. 3.

Unlike in the method according to FIG. 3, a further step S5 is provided following step S4, in which a fourth wear value V4 of the third vehicle brake 28 and a fifth wear value V5 of the fourth vehicle brake 30 are determined based on the second wear value V2 of the first vehicle brake 24.

When determining the fourth and fifth wear value V4, V5 from the second wear value V2 (indicated by an arrow 60, 62 in each case in FIG. 5) a substantially exponential characteristic curve can be expected between the second and fourth wear value V2, V4 or between the second and fifth wear value V2, V5, as the second, fourth and fifth wear value V2, V4, V5 do not indicate the states of wear of vehicle brakes 24-30 on the same wheel axle 12, 14.

This is due to the fact that a greatly differing axle load distribution can be expected between the wheel axles 12, 14.

Here too, knowledge of the axle load distribution can also be used similarly to step S3 during the previous braking actions for very precise determination of the fourth and fifth wear value V4, V5. In particular, the control unit 32 processes the axle load distribution of the previous braking actions for this purpose when determining the fourth and fifth wear value V4, V5.

If the first wheel axle 12 were the front wheel axle of the motor vehicle 10, on account of the axle load distribution a logarithmic curve, in other words a reverse exponential curve, of the characteristic curves of different wheel axles 12, 14 could be expected instead of the exponential curve, insofar as the axis plotting of the characteristic curves remained unchanged compared with the previously described exponential curve.

The invention claimed is:

1. A method for determining wear values on at least a first and a second vehicle brake of a motor vehicle, which brakes are assigned to a first or second vehicle wheel of a same first wheel axle, wherein the first vehicle brake has an actuator piston which presses a friction lining against a brake disc mounted such that it rotates in an actuating position, and an electromechanical actuator unit, and wherein the method comprises the following steps:

determining a first wear value which indicates wear to the friction lining of the first vehicle brake, by taking into account at least one wear-determining influencing parameter affecting a running history of the vehicle;

depending on whether the first wear value satisfies a predetermined criterion, taking of a measurement of the wear to the friction lining of the first vehicle brake by moving the electromechanical actuator unit and by recording a profile of an operating parameter of the electromechanical actuator unit during movement;

determining, based on the measurement, a second wear value which indicates wear to the friction lining of the first vehicle brake;

determining a third wear value of the second vehicle brake based on the second wear value of the first vehicle brake; and determining a fourth wear value for a third vehicle brake assigned to a third or fourth vehicle wheel of a same second wheel axle, wherein the fourth wear value is determined based on the second wear value using at least one of a substantially exponential or a logarithmic characteristic curve that accounts for an axle load distribution between the first wheel axle and the second wheel axle.

2. The method according to claim 1, wherein a predetermined criterion of the first wear value involves an assessment as to whether the first wear value lies above a predetermined threshold value.

3. The method according to claim 1, wherein determining the first wear value includes a calculation based on a mathematical model, wherein the wear-determining influencing parameter affecting the running history of the vehicle is taken into account in the mathematical model.

4. The method according to claim 1, wherein the wear-determining influencing parameter affecting the running history of the vehicle comprises at least one of the following influencing parameters:

a final total of a distance driven by the vehicle;

a total distance driven by the vehicle since the friction lining was last replaced;

a time that has elapsed since a vehicle brake system was first put into service;

a time that has elapsed since the friction lining was last replaced;

a period of use of the vehicle since it was first put into service; and a period of use of the vehicle since the friction lining was last replaced.

5. The method according to claim 1, wherein the determining the third wear value includes a calculation based on an additional mathematical model, wherein at least one wear-determining influencing parameter affecting the running history of the second vehicle brake is utilized taken into account in the additional mathematical model.

6. The method according to claim 4, wherein the wear-determining influencing parameter affecting the running history of the second vehicle brake comprises at least one of the following influencing parameters:

duration of previous braking actions of the second vehicle brake;

a pressure profile, in particular the time curve of the friction braking force, at the second vehicle brake of previous braking actions by the second vehicle brake;

a pressure gradient profile, in particular the time curve of the friction braking force gradients, at the second vehicle brake of previous braking actions by the second vehicle brake;

wheel speeds of the second vehicle wheel during previous braking actions by the second vehicle brake;

a temperature profile of the previous braking actions of the second vehicle brake on a component of the second vehicle brake; and an environmental condition to which the second vehicle brake was exposed during previous braking actions.

7. The method according to claim 1, wherein when determining the third wear value, the axle load distribution of the previous braking actions is taken into account, wherein a characteristic curve between the second and third wear value of the first wheel axle has a substantially linear profile.

8. The method according to claim 1, wherein the first wheel axle, to which the first and second vehicle brakes are assigned, is the front wheel axle or the rear wheel axle of the motor vehicle.

9. The method according to claim 1, wherein the third and fourth vehicle wheel are assigned to the second wheel axle of the motor vehicle which differs from the first wheel axle, to which in turn the third vehicle brake and a fourth vehicle brake are assigned, wherein the fourth wear value of the third vehicle brake and a fifth wear value of the fourth vehicle brake are determined on the basis of the second wear value of the first vehicle brake.

10. The method according to claim 9, wherein when determining the fourth and fifth wear value, the axle load distribution of the previous braking actions is incorporated.

11. The method according to claim 1, wherein the electromechanical actuator comprises an electromotive drive unit and an actuator unit interacting with the actuator piston, wherein the electromotive drive unit is designed to move the actuator unit, in order to press the friction lining against a brake disc, and wherein an operating parameter of the electromechanical actuator unit comprises a motor current of the electromotive drive unit and/or a speed of the electromotive drive unit.

12. The method according to claim 2, wherein determining the first wear value includes a calculation based on a mathematical model, wherein the wear-determining influencing parameter affecting the running history of the vehicle is taken into account in the mathematical model.

13. The method according to claim 12, wherein the wear-determining influencing parameter affecting the running history of the vehicle comprises at least one of the following influencing parameters:

a final total of a distance driven by the vehicle;

a total distance driven by the vehicle since the friction lining was last replaced;

a time that has elapsed since a vehicle brake system was first put into service;

a time that has elapsed since the friction lining was last replaced;

a period of use of the vehicle since it was first put into service; and a period of use of the vehicle since the friction lining was last replaced.

14. The method according to claim 13, wherein the electromechanical actuator comprises an electromotive drive unit and an actuator unit interacting with the actuator piston, wherein the electromotive drive unit is designed to move the actuator unit, in order to press the friction lining against a brake disc, and wherein an operating parameter of the electromechanical actuator unit comprises a motor current of the electromotive drive unit and/or a speed of the electromotive drive unit.

15. The method according to claim 5, wherein the additional mathematical model is adjusted using the second wear value.

16. The method according to claim 6, wherein the pressure profile is a time curve of the friction braking force.

17. The method according to claim 6, wherein the pressure gradient profile is a time curve of friction braking force gradients.

* * * * *